(12) United States Patent
Chak et al.

(10) Patent No.: US 7,270,298 B2
(45) Date of Patent: Sep. 18, 2007

(54) PERSONAL FLYING APPARATUS

(76) Inventors: Mark Chak, 435 Neptune Ave., Apt. 4A, Brooklyn, NY (US) 11224; Alexander Chak, 435 Neptune Ave., Apt. B-2, Brooklyn, NY (US) 11224

( * ) Notice: Subject to any disclaimer, the term of this patent is extended or adjusted under 35 U.S.C. 154(b) by 0 days.

(21) Appl. No.: 11/219,147

(22) Filed: Sep. 2, 2005

(65) Prior Publication Data
US 2007/0051853 A1  Mar. 8, 2007

(51) Int. Cl.
*B64D 17/00* (2006.01)

(52) U.S. Cl. .............................. 244/146; 2/2.11; 2/455

(58) Field of Classification Search ............... 244/142, 244/143, 146, 31, 32, 25, 16, 153 R, 155 R, 244/145, 151 R, 151 B; 2/DIG. 3, 2.11, 2/455
See application file for complete search history.

(56) References Cited

U.S. PATENT DOCUMENTS

| | | | | |
|---|---|---|---|---|
| 1,060,058 A | * | 4/1913 | Atwater | 244/25 |
| 1,287,134 A | * | 12/1918 | Swanson | 244/142 |
| 1,569,391 A | * | 1/1926 | Sussna et al. | 244/139 |
| 2,405,907 A | * | 8/1946 | Schmitt | 244/88 |
| 4,050,653 A | * | 9/1977 | Sayers | 244/32 |
| 4,261,534 A | * | 4/1981 | Roselli | 244/22 |
| 5,967,459 A | * | 10/1999 | Hayashi | 244/32 |
| 6,708,927 B2 | * | 3/2004 | Chen | 244/143 |

OTHER PUBLICATIONS

Collins French Dictionary, Harper Collins Publishers, 2000.*

* cited by examiner

*Primary Examiner*—Stephen A Holzen
(74) *Attorney, Agent, or Firm*—I. Zborovsky

(57) ABSTRACT

A personal flying apparatus has a substantially horizontal element having a lower surface adapted to acted on by a wind upwardly so as to produce a wind-generated lifting force, and an inflatable element connected with the substantially horizontal element and filled with gas which is lighter than air so as to produce a gas-generated lifting force, so that both the wind-generating lifting force and the gas-generating lifting force jointly lift the flying apparatus to allow it to fly.

1 Claim, 4 Drawing Sheets

PERSONAL FLYING APPARATUS

BACKGROUND OF THE INVENTION

The present invention relates to personal flying apparatuses.

Some apparatuses are known in the art, for example gliders, parachutes, etc. The existing apparatuses, however can be improved by providing a more efficient lifting force.

SUMMARY OF THE INVENTION

Accordingly, it is an object of the present invention to provide a flying apparatus which is a further improvement of the existing flying apparatuses.

In keeping with these objects and with others which will become apparent hereinafter, one feature of the present invention resides, briefly stated, in a personal flying apparatus, comprising a substantially horizontal element having a lower surface adapted to acted on by a wind upwardly to create a wind-generated lifting force; and an inflatable element connected with said substantially horizontal element and filled with gas which is lighter than air to create a gas-generated lifting force, so that both the wind-generating lifting force and the gas-generating lifting force jointly lift the flying apparatus to allow it to fly.

When the flying apparatus is designed in accordance with the present invention, it utilizes the wind force and the gas force to create a lifting force for the apparatus in an advantageous manner.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
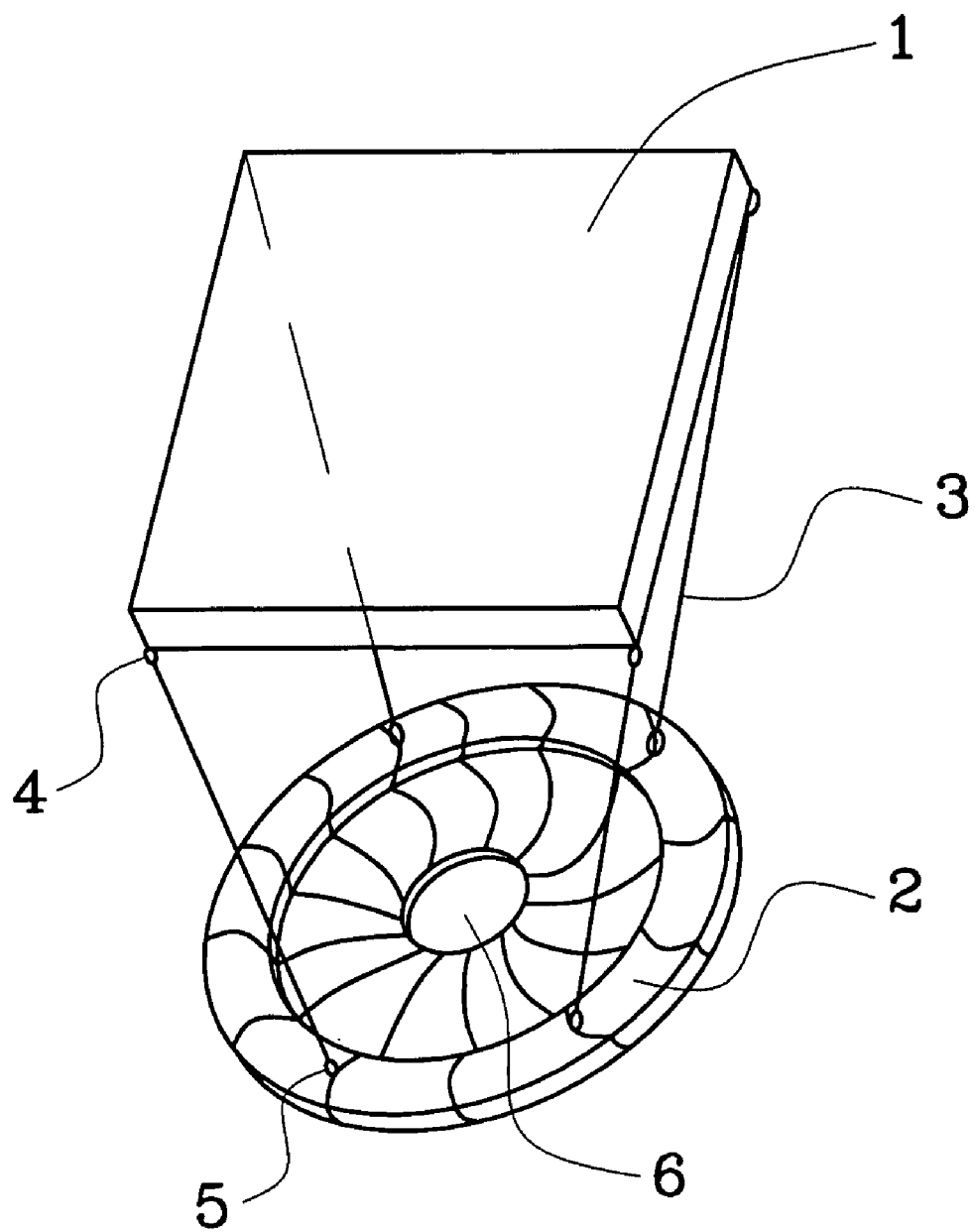
FIG. 1 is a view showing a flying apparatus in accordance with a first embodiment of the present invention.

FIG. 1 shows a personal flying apparatus in accordance with one embodiment of the present invention. The personal flying apparatus has a substantially horizontal element which is identified with reference numeral 1. In this embodiment the substantially horizontal element 1 is formed as kite element. The apparatus also has an inflatable element which is identified as a whole with reference numeral 2. It can be formed as sphere, a tube or the like and inflated with gas which is lighter than air, for example helium.

The upper substantially horizontal element 1 and the lower inflatable element 2 are connected with one another for example by ropes which is identified with reference numeral 3. Each rope 3 has means 4 for connecting one end of the rope to the substantially horizontal element 1, and means 5 for connecting another end of the rope to the inflatable element 2. The reference numeral 6 identifies a place for a seat for a user.

When the inflatable apparatus is used by a user, wind acts from below against a lower surface of the substantially horizontal element 1 so that wind force generates a wind-generated lifting force of the apparatus, and at the same time the gas in the inflatable element 2 generates additional lifting force, so that the apparatus can be movable under the action of the combined force of wind and gas.

Figure 2:
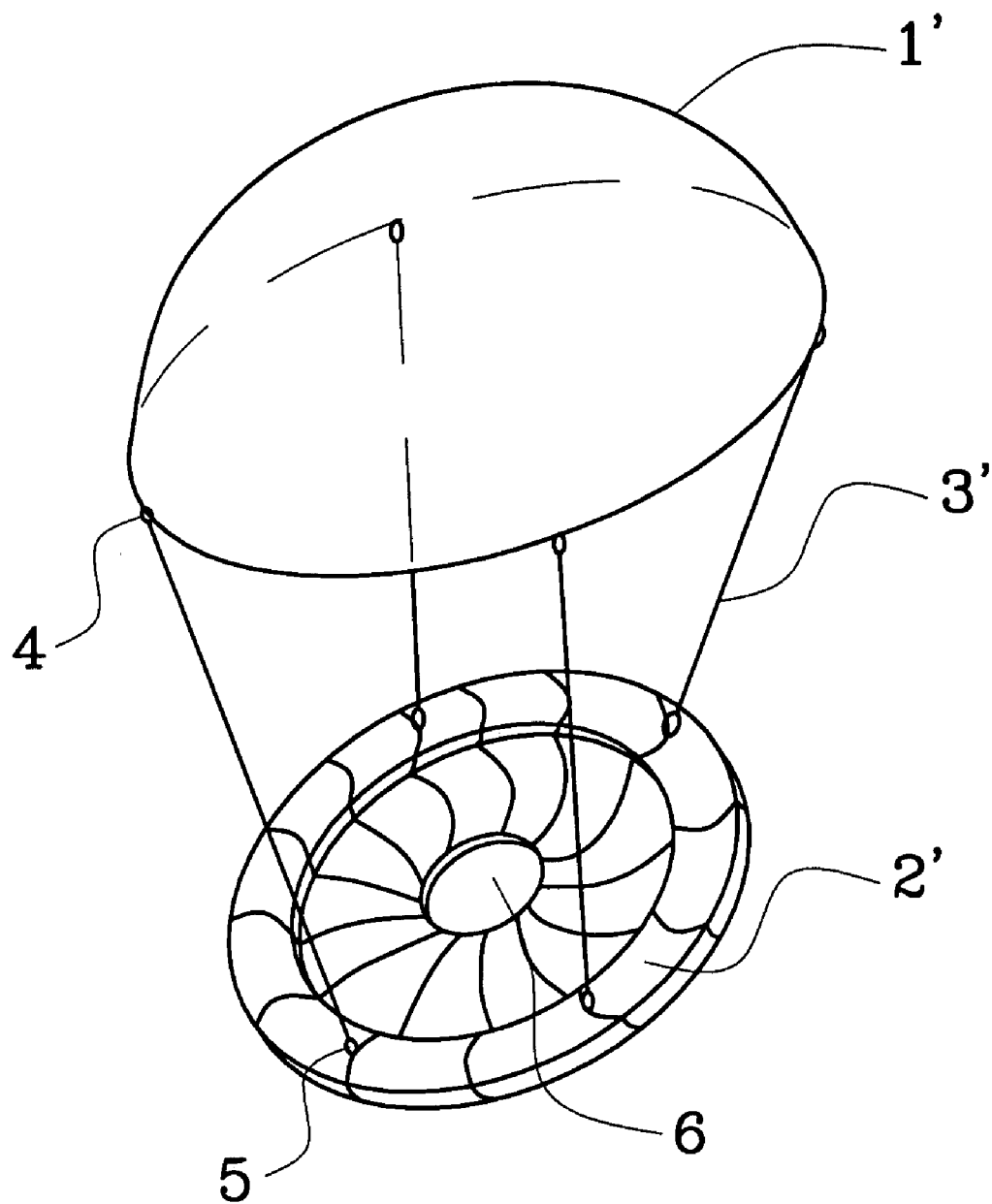
FIG. 2 is a view showing a flying apparatus in accordance with a second embodiment of the present invention.

The embodiment shown in FIG. 2 substantially corresponds to the apparatus shown in FIG. 1. However, as a substantially horizontal element-parachute 1' is utilized. The ropes 3' connect the parachute to the inflatable element 2'. In this apparatus also the lifting force is provided by two forces, namely the lifting force of wind which acts against the lower surface of the parachute 1' and the lifting force of gas in the inflatable element 2' so as to create a significant lifting force as a result of wind-gas action.

Figure 3:
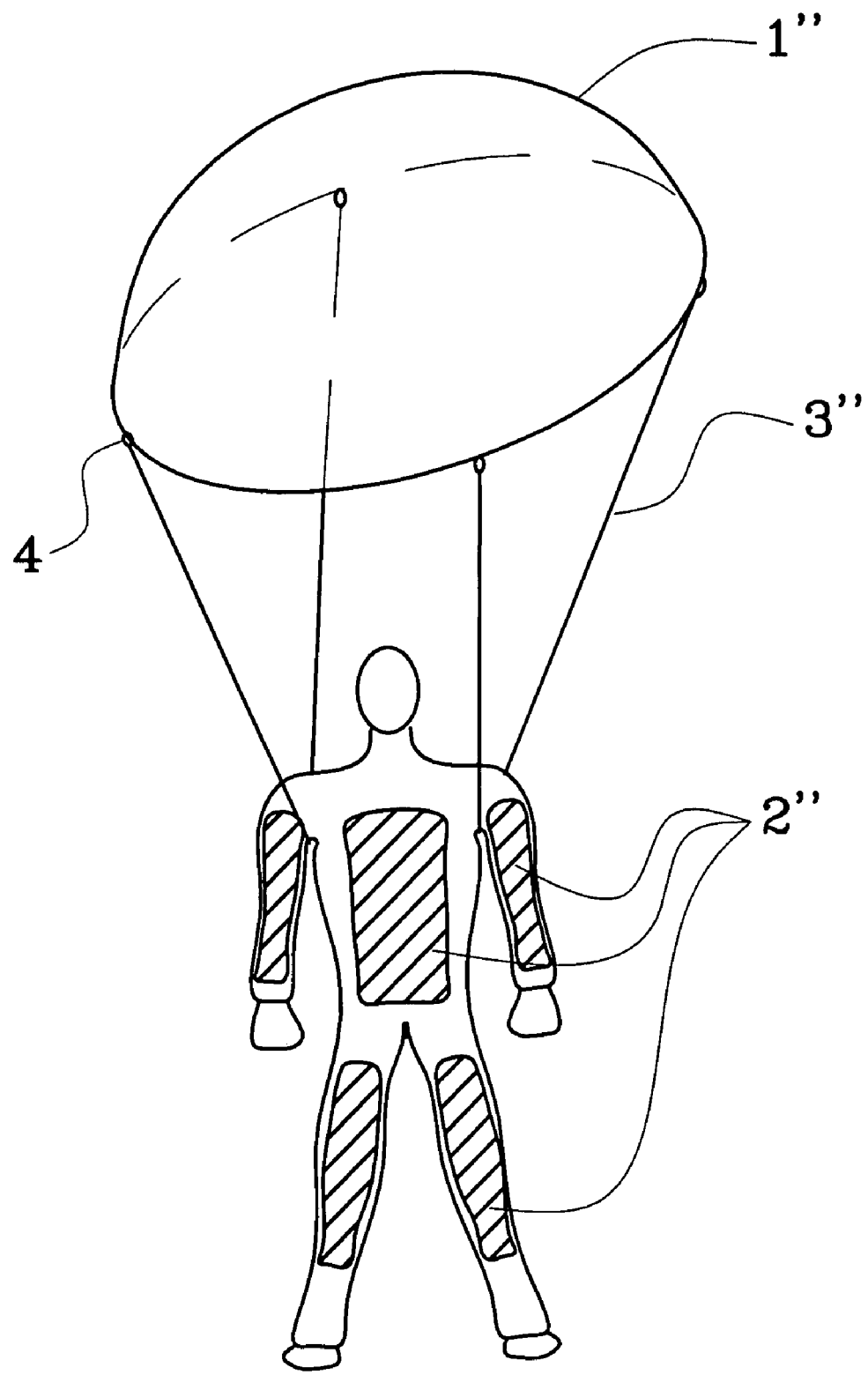
FIG. 3 is a view showing a flying apparatus in accordance with a third embodiment of the present invention.

The embodiment shown in FIG. 3 substantially corresponds to the embodiment shown in FIG. 2. The flying apparatus shown in FIG. 3 also has a substantially horizontal element 1" which is formed as a parachute. In this embodiment the inflatable element 2" is formed as an inflatable article of clothing, for example an inflatable suit which a user can wear. The suit 2" is connected by ropes 3" with the parachute 1". The lifting force of the apparatus also is created by combined action of the wind force and gas force.

Figure 4:
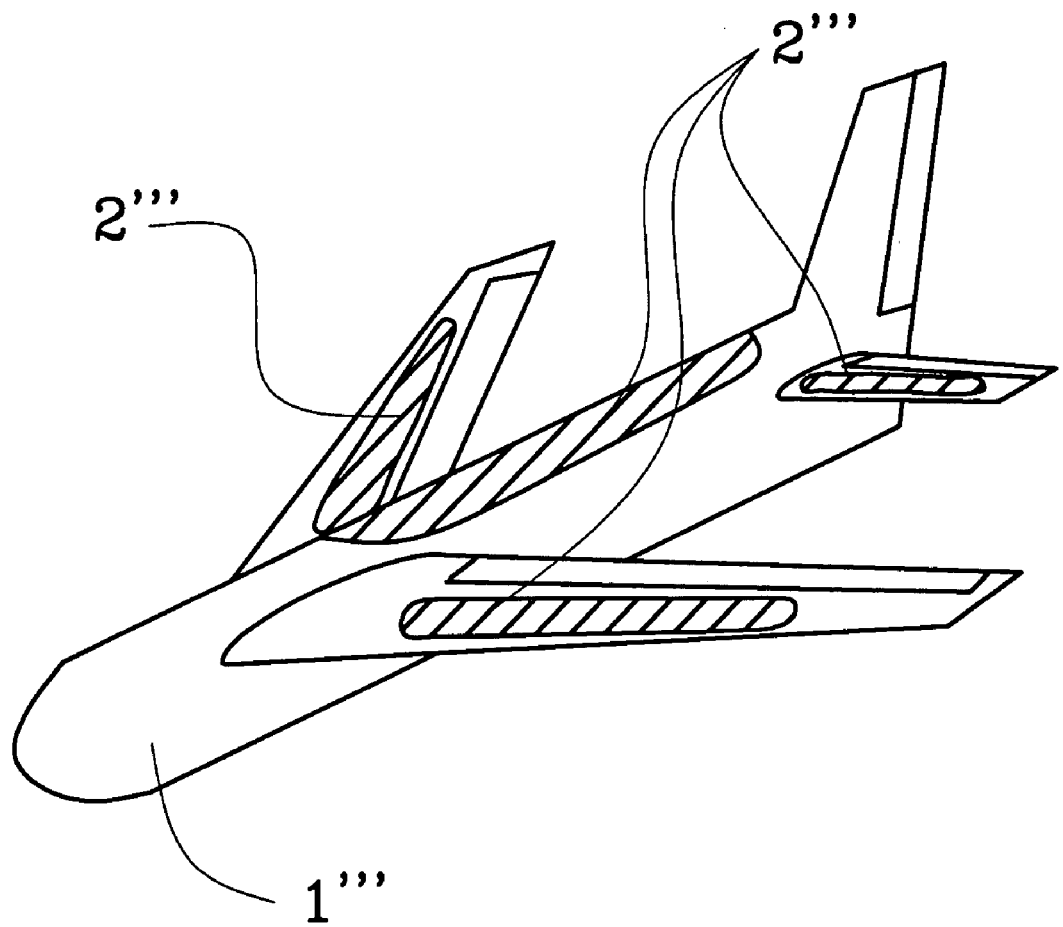
FIG. 4 is a view showing a flying apparatus in accordance with a fourth embodiment of the present invention.

Finally, FIG. 4 shows a further embodiment of the present invention. Here the substantially horizontal element is formed as a glider 1'''. The inflatable element 2''' can be formed as one or a plurality of elements connected with the glider 1'''. The Inflatable elements can be located in the body of the glider, suspended underneath the body of the planer, etc. Here again, the lifting force of the apparatus is created by a combined action of the wind force and the gas force.

It will be understood that each of the elements described above, or two or more together, may also find a useful application in other types of constructions differing from the types described above.

While the invention has been illustrated and described as embodied in a personal flying apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A personal flying apparatus, comprising a substantially horizontal element having a lower surface adapted to be upwardly acted on by a wind so as to produce a wind-generated lifting force; and an inflatable element connected with said substantially horizontal element and filled with gas which is lighter than air so as to produce a gas-generated lifting force; so that both the wind-generating lifting force and the gas-generating lifting force jointly lift the flying apparatus to allow it to fly, wherein said inflatable element is formed as an inflatable article of clothing, and said substantially horizontal element is formed as a flat kite.

* * * * *